May 10, 1966  M. B. COLLITO  3,250,002
DENTAL METHODS EMPLOYING A CYANOACRYLATE
Filed Feb. 26, 1962  2 Sheets-Sheet 1
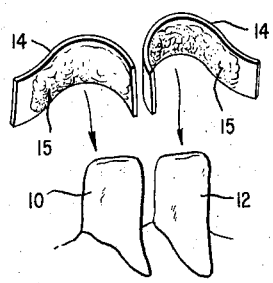
FIG.1
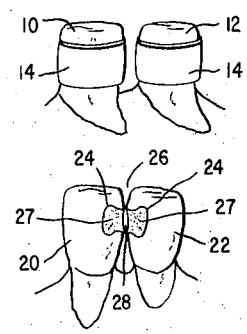
FIG. 2
FIG.4A
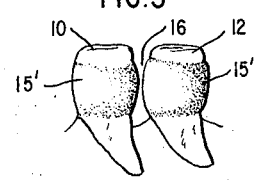
FIG.3
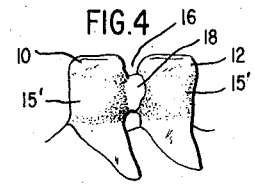
FIG.4
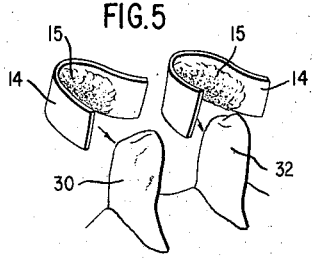
FIG.5
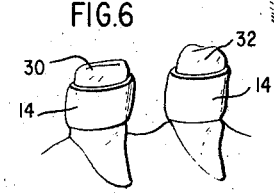
FIG.6
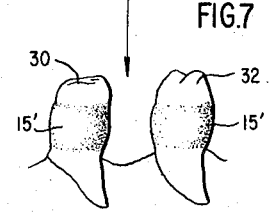
FIG.7
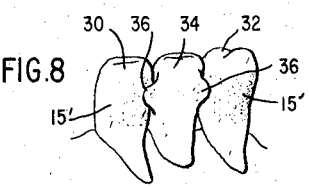
FIG.8
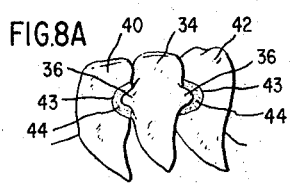
FIG.8A
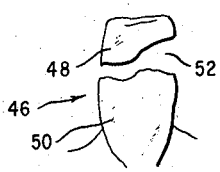
FIG.9
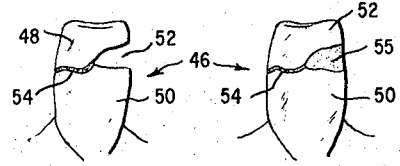
FIG.10  FIG.11
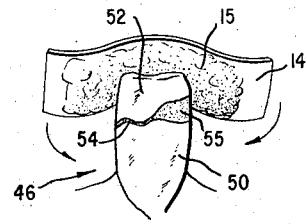
FIG.12
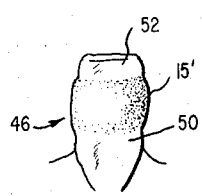
FIG.13
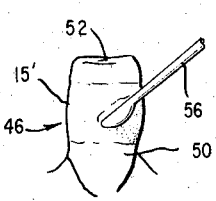
FIG.14
INVENTOR.
MICHAEL B. COLLITO
BY
Shapiro and Shapiro
ATTORNEYS

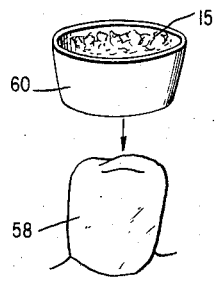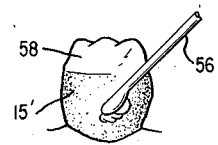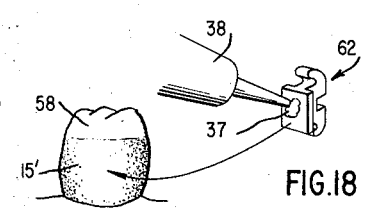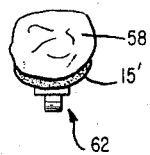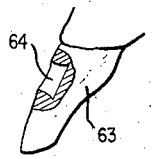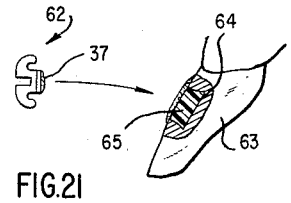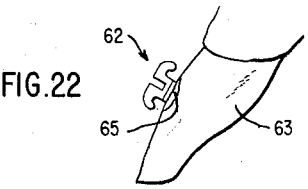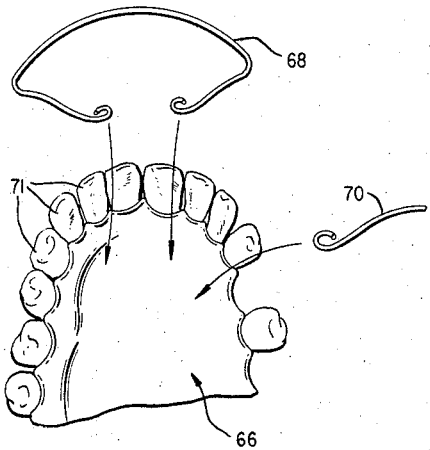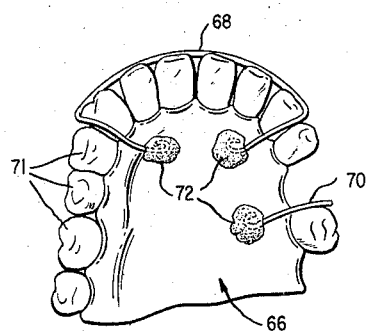

United States Patent Office 3,250,002
Patented May 10, 1966

3,250,002
DENTAL METHODS EMPLOYING A CYANOACRYLATE
Michael B. Collito, South Orange, N.J.
(353 Roseville Ave., Newark, N.J.)
Filed Feb. 26, 1962, Ser. No. 175,410
12 Claims. (Cl. 32—6)

This invention relates generally to orthodontic methods and devices and more particularly is concerned with orthodontic practices including the attachment of appliances to teeth, the splinting of adjacent teeth, the installation of prosthetic devices, the repair of tooth fractures, and in general the correction and repair of dental anomalies.

In the applicant's co-pending application, Serial No. 75,052, filed December 8, 1960, is described in detail the use of an adhesive substance known as Eastman 910 in various dental and medical practices. The description includes the use of such adhesive alone or in conjunction with other materials in carrying out the purposes of the invention. The present invention is in certain respects an improvement upon the invention described and claimed in applicant's co-pending application and broadly is concerned with the use of an adhesive, such as the highly preferred Eastman 910, in conjunction with substances known generically in the dental profession as dental or orthodontic resins. Applicant has discovered that such resins may be employed in conjunction with an adhesive such as Eastman 910 in the performance of a wide variety of dental orthodontic functions, such as those referred to above, with unexpected and highly advantageous results.

By virtue of the present invention it is possible to attain greater simplicity, economy, permanency, and esthetic appeal in dental or orthodontic practices than has heretofore been attainable. Moreover, the present invention makes possible the achievement of certain practices which heretofore have been unrealized, albeit long needed and sought.

It is accordingly a principal object of the present invention to provide improved methods and devices for the foregoing purposes. This, and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein:

FIGURES 1 through 4 illustrate different stages in the practice of tooth splinting in accordance with the invention;

FIGURE 4A illustrates a modified version of a tooth splinting practice of the invention;

FIGURES 5 through 8 illustrate different stages in the practice of installing an artificial tooth or other prosthetic device in accordance with the invention;

FIGURE 8A is a view illustrative of a modified tooth installation practice of the invention;

FIGURES 9 through 14 illustrate different stages in the practice of tooth fracture repair in accordance with the invention;

FIGURES 15 through 18 illustrate different stages in the practice of installing a tooth appliance in accordance with the invention;

FIGURE 19 is a view of a modified form of appliance installation in accordance with the invention;

FIGURES 20 through 22 illustrate different stages in the practice of still another appliance installation in accordance with the invention; and FIGURES 23 and 24 illustrate different stages in another practice of the invention, employing a retainer device.

In the attainment of the purposes of the present invention, applicant employs in conjunction two substances, one of which will be termed generically an "adhesive" and the other of which will be termed generically a "dental resin." The highly preferred adhesive is sold by the Eastman Chemical Company of Kingsport, Tennessee, under the name "Eastman 910 Adhesive." This adhesive is a monomeric alkyl ester of alpha-cyanoacrylic acid having the general formula:

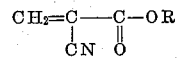

Where R is an alkyl group of 1 to 16 carbon atoms, a cyclohexyl group, or a phenyl group. More specifically, the Eastman 910 Adhesive is 90–92% methyl alpha-cyanoacrylate, with 3–4% ester type plasticizer, 5–6% polymeric type thickening agent, and a trace of an inhibitor or stabilizer. Thin films of the adhesive are rapidly autopolymerizable, being stabilized against polymerization in bulk by a stabilizing agent such as sulphur dioxide, present in a concentration of about 0.001% to 0.06% by weight. Highly tenacious bonds are rapidly produced with very thin applications of the adhesive. Adhesives of the foregoing type are described in the following United States patents: 2,721,858; 2,748,050; 2,756,251; 2,763,585; 2,763,677; 2,765,332; 2,768,109; 2,776,232; 2,784,127; 2,784,215; 2,794,788; 2,816,093.

Dental resins have been employed in the dental profession for at least a decade in the making of dental appliances, such as dentures, jacket crowns and the like, and in the making of direct fillings. In general, the substances employed are synthetic polymerizable materials, such as the rapid setting acrylics. A major constituent of such substances in commonly methyl methacrylate. The commercially available materials which may be "self-curing" and "rapid-setting," include "Bonfil" sold by the L. D. Caulk Company of Milford, Delaware, "Cold Cure Acrylic" sold by the Unitek Corporation of California (formulated by R. P. Walther Company of Los Angeles, California), "Acralite 88," "Fast Cure," and "Fast Crown" sold by the Acrylite Company of New York City, New York. For further disclosure of such materials reference may be made to the patent literature, including Patent No. 2,569,767, issued October 2, 1951 for "Dental Material and Method" and assigned to the L. D. Caulk Company; Patent No. 2,558,139, issued June 26, 1951, for "Dental Material and Method" and assigned to the L. D. Caulk Company; Patent No. 2,947,716, issued August 2, 1960, for "Mixtures of Lower Alkyl Acrylite Polymers and Methacrylate Polymers for Dough Composition" assigned to H. D. Justi & Son Inc.; Patent No. 2,877,199, issued March 10, 1959, for "Dental Composition Comprising Synthetic Polymer, Solvent Therefor, and Inorganic Filler"; and Patent No. 2,413,294, issued December 31, 1946, for "Cementitious Preparations," The preferred dental resin or resinous substance employed in the present invention is obtained by polymerizing methyl methacrylate (methyl ester of alpha-methylacrylic acid), but such substances per se do not constitute the present invention, and it will be apparent to those skilled in the art that other resinous substances may be employed. In general, the dental resin may be compounded from one or more solid finely divided polymers and one or more liquid polymerizable monomers, the monomer portion of the composition forming at least a partial solvent for the polymer portion. The substances may also contain well known promoters, catalysts, stabilizers, plasticizers, pigments, etc. Among the known dental resins are the ethyl and methyl methacrylate polymers and their copolymers, vinyl chloride and vinyl acetate resins and their copolymers and polystyrene resins.

Turning now to FIGURES 1 through 4 of the drawings, a first embodiment of the invention is applied to the splinting or stabilization of adjacent teeth 10 and 12. In accordance with the invention, after the teeth are cleaned and dried, a base layer of dental resin is formed upon the adjacent teeth. This may be accomplished by preparing a batch of resinous "dough," in accordance with the usual practices for the preparation of dental resins, and by applying the plastic dough to matrix bands 14 which are applied to the teeth. The bands may be flexible strips of "Mylar" material (available from the Du Pont Company) or preformed of malleable metal, such as gold or stainless steel, which will be further described. The strip bands 14 are wrapped about the teeth as indicated in FIGURE 1, with the plastic dough directed against the tooth enamel. The bands then appear as shown in FIGURE 2 and are held in position for about three to five minutes, as by the aid of an implement such as a plier. After this interval, when the risin has partilly set, the matrix bands are loosened and removed, the resinous material adhering to the teeth, but not appreciably to the bands. The resinous material may then be shaped by suitable dental implements to form smooth, esthetically pleasing contoured base layers 15' about the respective teeth as shown in FIGURE 3. It will be observed that at the region 16 the teeth are adjoining, the base layers of resinous material are shaped so that the layers approach physical contact.

Although most of the dental resins described above are generally thought of as being "fast setting," much longer periods than the aforesaid three to five minute period have heretofore been required for sufficient curing of the resinous material to attain the strength necessary for further orthodontic procedures. It has now been discovered that the application of Eastman 910 adhesive (or monomer) to the dental resin significantly accelerates curing of the resin and permits the use of the base layer for orthodontic purposes almost immediately. Previously much longer periods, as much as several hours, have been required to obtain the needed base layer strength. Moreover, the Eastman 910 serves the dual function of hastening the setting of the resinous material and providing an anchorage to the base layer. Thus, in the practice of the invention illustrated in FIGURES 1 through 4, a thin film 18 of Eastman 910 is applied to the region 16 where the teeth adjoin, and preferably over entire exposed surface of the resinous base layers. The Eastman 910 material may be applied directly from the dispenser-nozzle container in which it is sold or by the aid of a suitable spreader or swab. The result is the rapid curing of the dental resin base layers, the quick adherence of the thin film of Eastman 910 to the respective layers, and almost immediate splinting or stabilization of the teeth.

FIGURE 4A illustrates a modified form of the invention. In accordance with this embodiment, the adjacent teeth to be splinted or stabilized are drilled by conventional techniques to form undercut cavities 24 at opposed tooth surfaces, and the cavities are filled with dental resin. The fillings are brought into close proximity at 26, and a thin film 28 of Eastman 910 is applied to the region 26 and preferably to the entire exposed surfaces of the fillings. The result, as in the arrangement of FIGURES 1 through 4, is a quick, strong bond between the adjacent teeth.

In the embodiment of FIGURES 5 through 8 of the drawing, the principles of the invention are applied to the installation of an artificial tooth to replace a missing natural tooth. Although for illustrative purposes the invention is shown applied to the installation of a single artificial tooth, the same principles are applicable to the installation of a group of teeth. In accordance with the invention the natural teeth 30 and 32 on either side of the gap to be filled by the artificial tooth are cleaned and dried and have a base layer of dental resin formed thereon in accordance with the techniques previously described. Thus, in FIGURE 5 the resinous dough 15 is applied to the matrix bands 14 as before, and the bands are wrapped around the teeth as in FIGURE 6 and held in place until the resinous material has partially cured (about three to five minutes in the usual case) and are then removed. After removal of the bands, the partially cured resinous material is smoothed and shaped as before to form the desired base layers 15' (FIGURE 7). A preferred form of artificial tooth is shown at 34. The tooth has a contoured lower surface to match the contour of the supporting dental ridge and has a pair of projections or ears 36 to aid in securing the tooth to the adjoining natural teeth. The artificial tooth may be molded from dental resin of the same general type employed in forming the base layers. As shown in FIGURE 7, the Eastman 910 may be applied to the ears 36 from the aforementioned dispenser-nozzle container 38, and then the artificial tooth may be inserted in the space between the adjoining natural teeth 30 and 32 as shown in FIGURE 8. A thin film of Eastman 910 is preferably formed over substantially the entire exposed area of the base layers 15'. Within a few minutes the Eastman 910 and underlying dental resin layers have hardened so that the artificial tooth is anchored firmly in place.

FIGURE 8A illustrates a modified version of the invention. In this embodiment cavities 43 are drilled in the opposed surfaces of the teeth 40 and 42 and are filled with the resinous filling material 44. The Eastman 910 is applied to the ears 36 of the artificial tooth 34 as before; the artificial tooth is installed; and then the Eastman 910 is applied as a thin film over the exposed area of the fillings.

FIGURES 9 through 14 pertain to the repair of tooth fractures. As shown in FIGURE 9, the tooth 46 has broken into two parts 48 and 50, as in an accident, and although the part 48 has been located by the patient a portion which would normally fill the gap 52 has been lost or pulverized. Such a tooth fracture has heretofore been almost impossible to repair with any permanency, and the conventional practice is to employ a jacket crown or the like in an attempt to restore the tooth. In accordance with the present invention, the parts of the tooth are cleaned and dried, and the adjacent tooth surfaces which fit are mated as shown in FIGURE 10 after the application of a drop of Eastman 910 to one of the parts. The parts are then pressed together to cause the Eastman 910 to form a thin film 54 which sets rapidly. Since the strong bonds obtained by the use of Eastman 910 result from the formation of thin, rapidly polymerizable films of the material, the gap 52 cannot readily be repaired by the use of Eastman 910. Hence, in accordance with the invention the gap 52 is filled with dental resin direct filling material 55, as previously specified, and the material is shaped to match the tooth contours as shown in FIGURE 11. Then, in accordance with the invention, a protective layer of dental resin is preferably formed about the entire region of the fracture. This may be accomplished as indicated in FIGURE 12 by applying the prepared dental resin dough 15 to a matrix band 14 which is wrapped about the tooth in the region of the fracture and held in place for the required partial curing interval, say three to five minutes. Then the band is removed, and the partially cured dental resin is formed into a smooth layer 15' as shown in FIGURES 13 and 14. The layer 15' is preferably covered by a thin film of Eastman 910 which may be applied by the use of an implement 56. The application of the Eastman 910 promotes the rapid curing of the dental resin. The result is a complete, esthetically pleasing restoration of the tooth. The film of Eastman 910 is transparent, and the dental resin layer may be transparent or colored by suitable pigments, as is well known in the art, to match the material to the coloring of the tooth. Suitably colored resin material may be employed in any and all of the embodiments of the invention.

FIGURES 15 through 18 illustrate an embodiment of the invention in which an orthodontic appliance is firmly anchored to a tooth. After the tooth 58 is cleaned and dried, the resinous dough 15 is applied to the inside of a preformed band 60. The band may be formed of a malleable material, such as stainless steel or gold, and is preferably somewhat bell-shaped so that it may conform to the general configuration of the tooth adjacent the dental ridge. Such bands are well known in the practice of orthodontia and need no further description. The use of a preformed band is for illustrative purposes only, and either the preformed band or the unformed flexible strip band may be employed in this embodiment of the invention or in any of the others in which bands are used.

The band 60 with the dough applied thereto is slipped into position over the tooth as shown in FIGURE 16 and is left in position for an interval of time (say three to five minutes) sufficient for partial setting of the resinous material. Then the band is removed, and the partially cured resin is shaped, as by the implement 56 shown in FIGURE 17, to form an esthetically appealing base layer 15' which conforms to the general appearance and configuration of the tooth. An appliance 62 may then be adhered to the base layer by means of Eastman 910.

In the form shown the appliance is a bracket known as an angle or edgewise type, but the invention is applicable to the installation of other types of brackets, such as the ribbon arch, universal, twin arch, pin and tube, labio-lingual, Begg, or the Kesling, or in fact to any appliance which it is desired to anchor to a tooth. A drop 37 of Eastman 910 is applied to the base of the bracket 62 from the dispenser container 38, and then the base of the bracket is pressed against the resinous base layer 15' with sufficient force to ensure the spreading of the Eastman 910 into a thin film and the conformation of the resinous material to the shape of the bracket base (to ensure accurate mating of the base layer and the bracket base). The appliance is held in position for about 10 to 20 seconds and then may be released. Firm attachment of the appliance to the tooth is obtained within a few minutes. It is preferred to form a thin layer of Eastman 910 over the entire exposed surface of the resinous layer 15' to hasten the curing of the entire base layer.

In some instances, a suitable base layer may be formed without completely surrounding the tooth. This concept of the invention is illustrated in FIGURE 19, wherein the base layer 15' extends only partially around the tooth as shown.

FIGURES 20 through 22 illustrate an embodiment of the invention which permits a difficult anchorage upon a milk tooth or baby tooth 63, although the same concept of the invention may be applied to permanent teeth if desired. In accordance with this embodiment, a cavity 64 is drilled in the surface of the tooth, in accordance with good dental practices, and the cavity is filled with dental resin filling material 65 to form a base layer which may be flush with or protrude slightly from the surface of the tooth. Then, even before the filling material has fully set, an appliance 62 may be attached to the tooth by placing a drop 37 of Eastman 910 to the base of the appliance and pressing the appliance against the resinous base layer as before. After a few moments the appliance may be released. The entire exposed area of the resinous material is preferably coated with a thin film of Eastman 910 to hasten the curing of the resin material as a unitary mass. The result is a rapidly obtained, firm anchorage upon the tooth 63, as shown in FIGURE 22.

FIGURES 23 and 24 illustrate the application of certain principles of the invention to an orthodontic device in which the resinous and adhesive substances are applied to the device, rather than to the teeth. The device 66 shown for illustrative purposes is a Hawley retainer known in the art. The device is formed of a suitable plastic, such as the resins previously described, and may be molded from an impression taken from the mouth of the patient in accordance with conventional techniques. The device is a form of plate having contours which match those of the palate and the peripheral teeth 71 and is held in position by the natural adhesion between the device and the palate with the interposition of a film of saliva. Such devices are used passively for retaining the teeth positions or actively for modifying the position of certain teeth. For applying forces to the teeth, auxiliaries, such as the wires 68 and 70, are secured to the device. The auxiliaries must be firmly anchored to the device and then can exert forces against the teeth by virtue of the configuration and/or resiliency of the wires.

The present invention permits the rapid anchorage of the auxiliaries without requiring the laboratory techniques normally utilized in the placement of the auxiliaries. For example, to secure the wires 68 and 70 to the device 66 mounds of dental resinous dough 72 are formed upon the surface of the plate. Then the enlarged ends of the wires to be anchored are pushed into the mounds, and a thin film of Eastman 910 is formed over the entire surface of the mounds. If desired, a drop of Eastman 910 may also be placed on the ends of the wires to be anchored before they are pushed into the resinous material and even under the mounds. The result is the rapid curing of the dental resin and the rapid and firm attachment of the wires to the device 66. When it is desired to change the position of a wire, as necessitated by the movement of teeth in the course of treatment, the wire to be moved may be clipped off or the associated mound of plastic material scaled or polished off, and a new wire may be placed by the technique just described. Mounds of dental resin may also be formed in suitable positions and with suitable protuberance (and cured as above) to engage lower teeth and open the bite of the patient.

While preferred embodiments of the invention have been shown and described, it will be apparent to those skilled in the art that changes can be made in these embodiments without departing from the principles and spirit of the invention, the scope of which is defined in the appended claims. For example, a basic principle of the invention is the conjoint use of dental resin and Eastman 910, which results in the rapid curing of the resin as well as the firm attachment of an object or device to the resin layer. However, within the broader aspects of the invention, the resin may be employed merely as a protective coating for a tooth, and the Eastman 910 material may be employed as a thin film over the coating to hasten the curing of the resin and further to seal the coating. Accordingly, the foregoing embodiments are to be considered illustrative, rather than restrictive of the invention, and those modifications which come within the meaning and range of equivalency of the claims are to be included therein.

The invention claimed is:

1. A method in which a cyanoacrylate is employed to accelerate curing of a dental resin, which comprises placing a mass of said resin upon a support in the absence of said cyanoacrylate material, and then, before said resin has fully cured, applying a film of said cyanoacrylate to said mass.

2. In the art of dentistry, a method in which a cyanoacrylate is employed to accelerate the formation of a protective layer upon a tooth, which comprises placing a mass of substantially uncured dental resin upon the tooth in the absence of said cyanoacrylate, and then, before said resin has fully cured, applying a film of said cyanoacrylate to said mass to cure the resin of said mass rapidly.

3. The method of claim 2, wherein said resin contains a substantial amount of methyl methacrylate.

4. The method of claim 2, wherein said cyanoacrylate is a monomeric alkyl ester of alpha cyanoacrylic acid.

5. In the art of dentistry, a method in which a cyanoacrylate is employed to install a device upon a tooth, which comprises placing a mass of substantially uncured dental resin upon the tooth in the absence of said cyanoacrylate, then, before said resin has fully cured, attaching said device to said mass by means of a film of said cyanoacrylate, whereby the resin of said mass is rapidly cured and said device is securely fixed to said tooth.

6. The method of claim 5, wherein said resin contains a substantial amount of methyl methacrylate.

7. The method of claim 5, wherein said cyanoacrylate is a monomeric alkyl ester of alpha cyanoacrylic acid.

8. In the art of dentistry, a method in which a cyanoacrylate is employed to install a device upon a tooth, which comprises forming a cavity in said tooth, filling said cavity with a dental resin in the absence of said cyanoacrylate, and attaching said device to said filling by means of a film of said cyanoacrylate before said resin has fully cured, whereby said resin is cured rapidly and said device is fixed securely to said tooth.

9. The method of claim 8, wherein said resin contains a substantial amount of methyl methacrylate.

10. The method of claim 8, wherein said cyanoacrylate is a monomeric alkyl ester of alpha cyanoacrylic acid.

11. A method in which a cyanoacrylate is employed for anchoring accessories to an orthodontic device and the like, which comprises placing dental resin dough upon said device in the absence of said cyanoacrylate, engaging a portion of the accessory with said dough, and applying a film of said cyanoacrylate to said dough to cause the same to cure rapidly and to fix said accessory to said device securely.

12. In the art of dentistry, a method in which a cyanoacrylate is employed for installing an orthodontic bracket upon a tooth, which comprises forming a cavity in said tooth, filling said cavity with a material to which said cyanoacrylate adheres securely, and adhesively attaching said bracket to the filling by means of a film of said cyanoacrylate.

References Cited by the Examiner
UNITED STATES PATENTS

| | | | |
|---|---|---|---|
| 1,146,264 | 7/1915 | Kelly | 128—89 |
| 2,035,347 | 3/1936 | Shotton | 32—15 |
| 2,481,177 | 9/1949 | Tofflemire | 128—89 |
| 2,755,552 | 7/1956 | Brandau | 32—2 |
| 2,794,788 | 6/1957 | Coover et al. | 260—881 XR |
| 2,915,824 | 12/1959 | Kesling | 32—14 |
| 2,971,258 | 2/1961 | Bien | 32—14 |
| 3,052,027 | 9/1962 | Wallshein | 32—14 |

OTHER REFERENCES

"Epoxy Resins," 1958, Reinhold Publishing Corp., New York, page 254.

RICHARD A. GAUDET, *Primary Examiner.*

ROBERT E. MORGAN, *Examiner.*